US008654394B2

(12) United States Patent
Ikuno

(10) Patent No.: US 8,654,394 B2
(45) Date of Patent: Feb. 18, 2014

(54) IMAGE PROCESSING APPARATUS, CONTROL METHOD, AND COMPUTER-READABLE MEDIUM

(75) Inventor: Takao Ikuno, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 363 days.

(21) Appl. No.: 13/023,846

(22) Filed: Feb. 9, 2011

(65) Prior Publication Data

US 2011/0228296 A1  Sep. 22, 2011

(30) Foreign Application Priority Data

Mar. 16, 2010  (JP) ................................. 2010-059926

(51) Int. Cl.
*G06K 9/00* (2006.01)
*G03F 3/08* (2006.01)

(52) U.S. Cl.
USPC .............................. 358/1.9; 358/515; 382/166

(58) Field of Classification Search
None
See application file for complete search history.

(56) References Cited

U.S. PATENT DOCUMENTS

| 7,613,833 | B2 | 11/2009 | Odaira et al. | 709/246 |
| 7,733,348 | B2 | 6/2010 | Katahira et al. | 345/543 |
| 7,804,618 | B2 | 9/2010 | Fujino et al. | 358/1.16 |
| 7,873,756 | B2 | 1/2011 | Shoji et al. | 710/20 |
| 7,889,379 | B2 | 2/2011 | Okayama et al. | 358/1.16 |
| 7,990,570 | B2 | 8/2011 | Shoji et al. | 358/1.6 |
| 2006/0001903 | A1 | 1/2006 | Ikuno | 358/1.15 |
| 2006/0269127 | A1* | 11/2006 | Ogden et al. | 382/166 |
| 2008/0046897 | A1 | 2/2008 | Odaira et al. | 719/326 |
| 2008/0204768 | A1 | 8/2008 | Ikuno et al. | 358/1.1 |
| 2008/0252919 | A1 | 10/2008 | Okayama et al. | 358/1.15 |
| 2011/0064320 | A1 | 3/2011 | Ikuno | 382/232 |

FOREIGN PATENT DOCUMENTS

JP  2004-104621  4/2004

OTHER PUBLICATIONS

Machine translation of JP Pub 2004104621 to Yamauchi Yasuaki.*

* cited by examiner

*Primary Examiner* — Benny Q Tieu
*Assistant Examiner* — Haris Sabah
(74) *Attorney, Agent, or Firm* — Fitzpatrick, Cella, Harper & Scinto

(57) ABSTRACT

An image processing apparatus for performing filling processing for input image data, comprises: a holding unit which holds, for a block formed from a predetermined number of pixels included in the image data, a representative color of the block generated by compression, a color layout of pixels included in the block, and an interpolation color which is a color other than the representative color included in the block; and a fill unit which performs filling processing of the compressed image data using the representative color, the color layout, and the interpolation color, when filling the block of the compressed image data with a specific color, the fill unit replacing the representative color corresponding to a position based on a type of the filling processing with the specific color and replacing the interpolation color with the same specific color as that of the representative color.

8 Claims, 13 Drawing Sheets

FIG. 3
2×2 PIXEL BLOCK,
FOR COLOR IMAGE OF 24 BITS PER PIXEL INCLUDING 8 BITS
FOR EACH OF R, G, AND B
301 → 
⬇
REPRESENTATIVE COLOR DETERMINATION
302 → 
⬇
COLOR LAYOUT DETERMINATION
303 → 
⬇
INTERPOLATION COLOR DETERMINATION
304 → 

IMAGE PROCESSING APPARATUS, CONTROL METHOD, AND COMPUTER-READABLE MEDIUM

BACKGROUND OF THE INVENTION

1. Field of the Invention

The present invention relates to a technique of receiving digital image data from outside of a device, storing, processing, and then outputting it.

2. Description of the Related Art

Among image processing apparatuses represented by copying machines and multi function peripherals, image processing apparatuses which have reading and printing units with higher resolution so as to process a high-resolution image are recently becoming popular in order to create a high-quality image. For this reason, the amount of image data to be processed by the device main body is remarkably increasing. Although the device main body needs to store such enormous image data, it is difficult to hold a lot of large image data because of the limited capacity of the main memory. Even when high-speed processing is necessary, the data bus of the main circuit is burdened with the enormous data amount, and therefore, data is transferred slowly, resulting in difficulty in high-speed processing.

Against this backdrop, there is used an image processing apparatus employing encoding processing of decreasing the data amount of large image data without degrading its image quality. A typical example of encoding compression processing is JPEG. Using discrete cosine transform, the JPEG compresses image data for every 8×8 or 16×16 pixel block, thereby implementing a high compression ratio. There has also been proposed a technique of dividing image data into smaller blocks, for example, 2×2 pixel blocks, determining the representative color and interpolation representative color of each of the blocks, and encoding them (Japanese Patent Laid-Open No. 2004-104621). Image data to be held in the device for such high-resolution image data processing need to be appropriately encoded and compressed not to put a burden on the memory or the data bus.

An image processing device inputs image data from outside, and processes and outputs it, as described above. A representative function of such an image processing device is a copy function of causing a scanner to read image data, converting it into digital image data, and outputting it on a paper sheet. Concerning the copy function, image processing is performed inside the device for the image data input from the reading unit. The image density or tint is changed to adjust the output image. An example of image processing most often used is image mask processing. Examples of image mask are frame erase functions such as a peripheral mask for erasing shadows at original edges, book frame erase for erasing the shadow at the center of a book original, and punch hole erase for erasing the punch holes of an original. Such image mask processing is a function of filling part of a digital image with a specific color. That is, processing fills part of a data area storing a digital image with specific data.

Applying image mask processing to the above-described high-resolution image poses two problems. The first is the problem of a process time caused by data filling. Although processing of filling image data with specific image data is simple in itself, frequent memory access and an enormous processing amount entail a longer memory write time. A high-resolution image requires a still longer process time because of the larger data filling amount. The second problem is the necessity of a decoding process time as encoded image data need be temporarily decoded. A high-resolution image in the form of raw image data is enormous in terms of data amount and is therefore held after encoded and compressed into, for example, the above-described JPEG format. However, an image compressed by a raster image compression method represented by JPEG encoding cannot partially be masked in the compressed state. To do this, it is necessary to temporarily decode the image into raw image data and then execute image data filling. Hence, the process time of decoding processing is added for the image mask. In addition, for this intermediate decoding, an intermediate buffer after the decoding is needed, and the memory accordingly needs to have an appropriate capacity.

SUMMARY OF THE INVENTION

According to one aspect of the present invention, there is provided an image processing apparatus for performing filling processing for input image data, comprising: a holding unit which holds, for a block formed from a predetermined number of pixels included in the image data, a representative color of the block generated by compression, a color layout of pixels included in the block, and an interpolation color which is a color other than the representative color included in the block; and a fill unit which performs filling processing of the compressed image data using the representative color, the color layout, and the interpolation color, when filling the block of the compressed image data with a specific color, the fill unit replacing the representative color corresponding to a position based on a type of the filling processing with the specific color and replacing the interpolation color with the same specific color as that of the representative color.

According to another aspect of the present invention, there is provided an image processing apparatus for performing filling processing for input image data, comprising: a holding unit which holds, for a block formed from a predetermined number of pixels included in the image data, a representative color of the block generated by compression, a color layout of pixels included in the block, and an interpolation color which is a color other than the representative color included in the block; and a fill unit which performs filling processing of the compressed image data using the representative color, the color layout, and the interpolation color, when filling the block of the compressed image data with a specific color, the fill unit replacing the representative color corresponding to a position based on a type of the filling processing with the specific color and replacing the color layout with data representing that all pixels have the same color as the representative color.

According to another aspect of the present invention, there is provided an image processing apparatus for performing filling processing for input image data, comprising: a holding unit which holds, for a block formed from a predetermined number of pixels included in the image data, a representative color of the block generated by compression, a color layout of pixels included in the block, and an interpolation color which is a color other than the representative color included in the block; and a fill unit which performs filling processing of the compressed image data using the representative color, the color layout, and the interpolation color, when filling the block of the compressed image data with a specific color, the fill unit filling the representative color corresponding to a position based on a type of the filling processing with the specific color, and comparing a size of data of the interpolation color with a size of data of the color layout, which are held by the holding unit, if the data of the interpolation color is smaller, replacing the interpolation color with the same specific color as that of the representative color, and if the data of the color layout is smaller, replacing the color layout with data representing that all pixels have the same color as the representative color.

According to another aspect of the present invention, there is provided a method of controlling an image processing apparatus for performing filling processing for input image data, comprising the steps of: causing a holding unit of the image processing apparatus to hold, for a block formed from a predetermined number of pixels included in the image data, a representative color of the block generated by compression, a color layout of pixels included in the block, and an interpolation color which is a color other than the representative color included in the block; and causing a fill unit of the image processing apparatus to perform filling processing of the compressed image data using the representative color, the color layout, and the interpolation color, in the filling step, when filling the block of the compressed image data with a specific color, the representative color corresponding to a position based on a type of the filling processing is replaced with the specific color, and the interpolation color is replaced with the same specific color as that of the representative color.

According to another aspect of the present invention, there is provided a computer-readable storage medium storing a program which is causing a computer to execute as: a holding unit which holds, for a block formed from a predetermined number of pixels included in the image data, a representative color of the block generated by compression, a color layout of pixels included in the block, and an interpolation color which is a color other than the representative color included in the block; and a fill unit which performs filling processing of the compressed image data using the representative color, the color layout, and the interpolation color, when filling the block of the compressed image data with a specific color, the fill unit replacing the representative color corresponding to a position based on a type of the filling processing with the specific color and replacing the interpolation color with the same specific color as that of the representative color.

According to the present invention, when performing image mask processing for high-resolution image data, compressed image data is filled so that a filling function with a specific color can be implemented. In addition, it is possible to perform image mask processing for image data that remains compressed. This obviates the necessity for temporary decoding before image mask processing and shortens the process time of decoding. Furthermore, since the intermediate buffer necessary for decoding is no longer needed, the memory utilization for filling processing can be reduced.

Further features of the present invention will become apparent from the following description of exemplary embodiments (with reference to the attached drawings).

BRIEF DESCRIPTION OF THE DRAWINGS

FIG. 3 is a view for explaining the basic concept of a compression method;

DESCRIPTION OF THE EMBODIMENTS

First Embodiment

Figure 1:
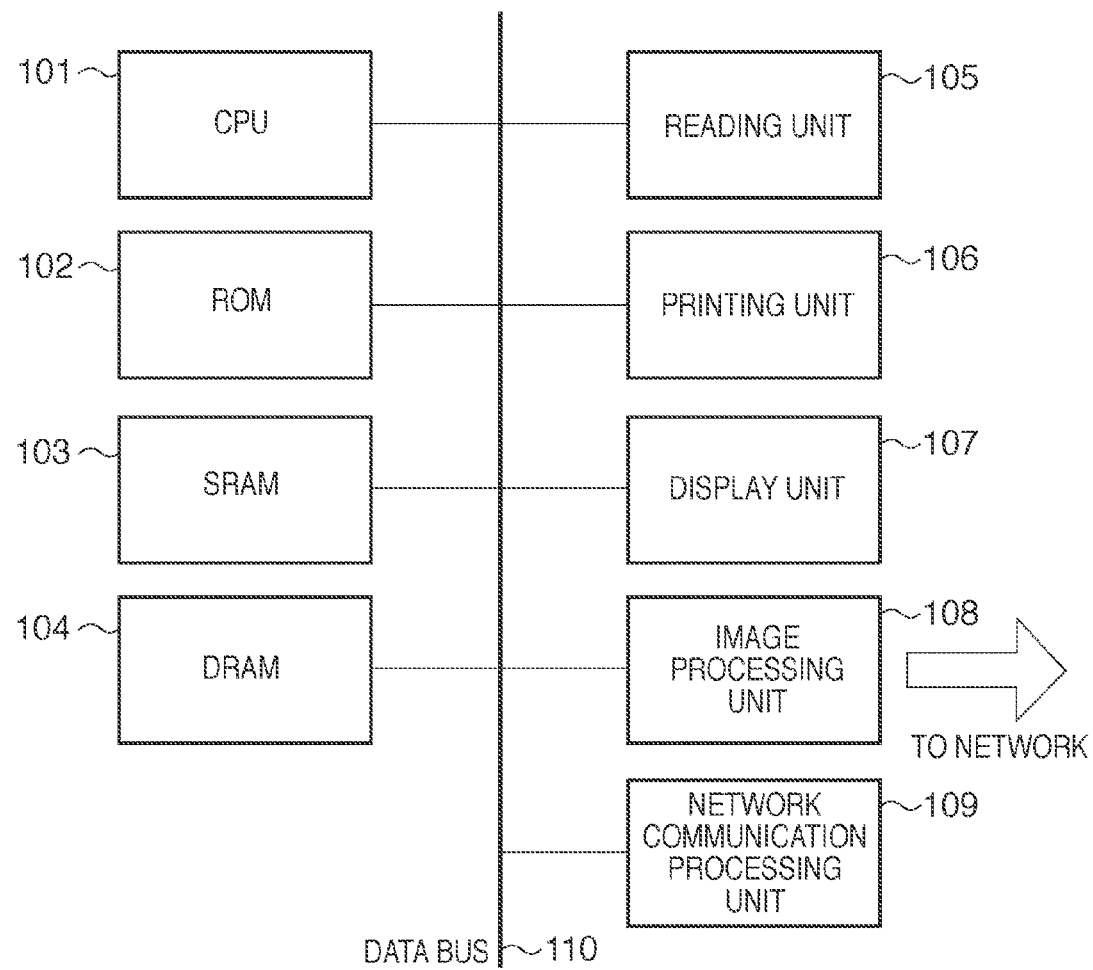
FIG. 1 is a block diagram showing an example of the hardware configuration of an image processing apparatus.

An embodiment of the present invention will now be described with reference to the accompanying drawings. A multi function peripheral will be exemplified as an image processing apparatus. FIG. 1 shows an example of the multi function peripheral. A CPU 101 serves as a system control unit and controls the entire apparatus. A ROM 102 is used to store the control programs of the CPU 101. An SRAM 103 stores set values registered by the operator, management data of the apparatus, and various kinds of work buffers. A DRAM 104 is used to store program control variables, and the like. A reading unit 105 is a device which reads image data and converts it into binary data. Original reading for transmission is performed using the reading unit 105. A printing unit 106 outputs the image data on a printing paper sheet. A display unit 107 serves as a user interface unit which displays information in the device. An image processing unit 108 performs encoding/decoding processing of image data to be handled in a communication control apparatus. A network communication processing unit 109 performs I/F to a network channel. A multi function peripheral to be exemplified here transmits image data read by the reading unit 105 to a network, or temporarily stores image data received from the network communication processing unit 109 in the SRAM 103 and causes the printing unit 106 to print it.

In the above-described multi function peripheral, the control units are connected via a data bus 110 so that image data is transferred via the data bus 110. In such a multi function peripheral, image data is input from the reading unit 105 or the network communication processing unit 109 and stored in the SRAM 103. The image data is then processed via the image processing unit 108 and the like and output to the printing unit 106 or the display unit 107.

A representative function of the above-described multi function peripheral is the copy function. This is the function of causing the image processing unit 108 to process image data read by the reading unit 105, temporarily storing the image data in the SRAM 103, and then outputting it from the printing unit 106 onto a paper sheet. An application function of the copy function is image mask processing. This function corresponds to, for example, original frame erase and punch hole erase.

[Image Mask Function]

Figure 2:
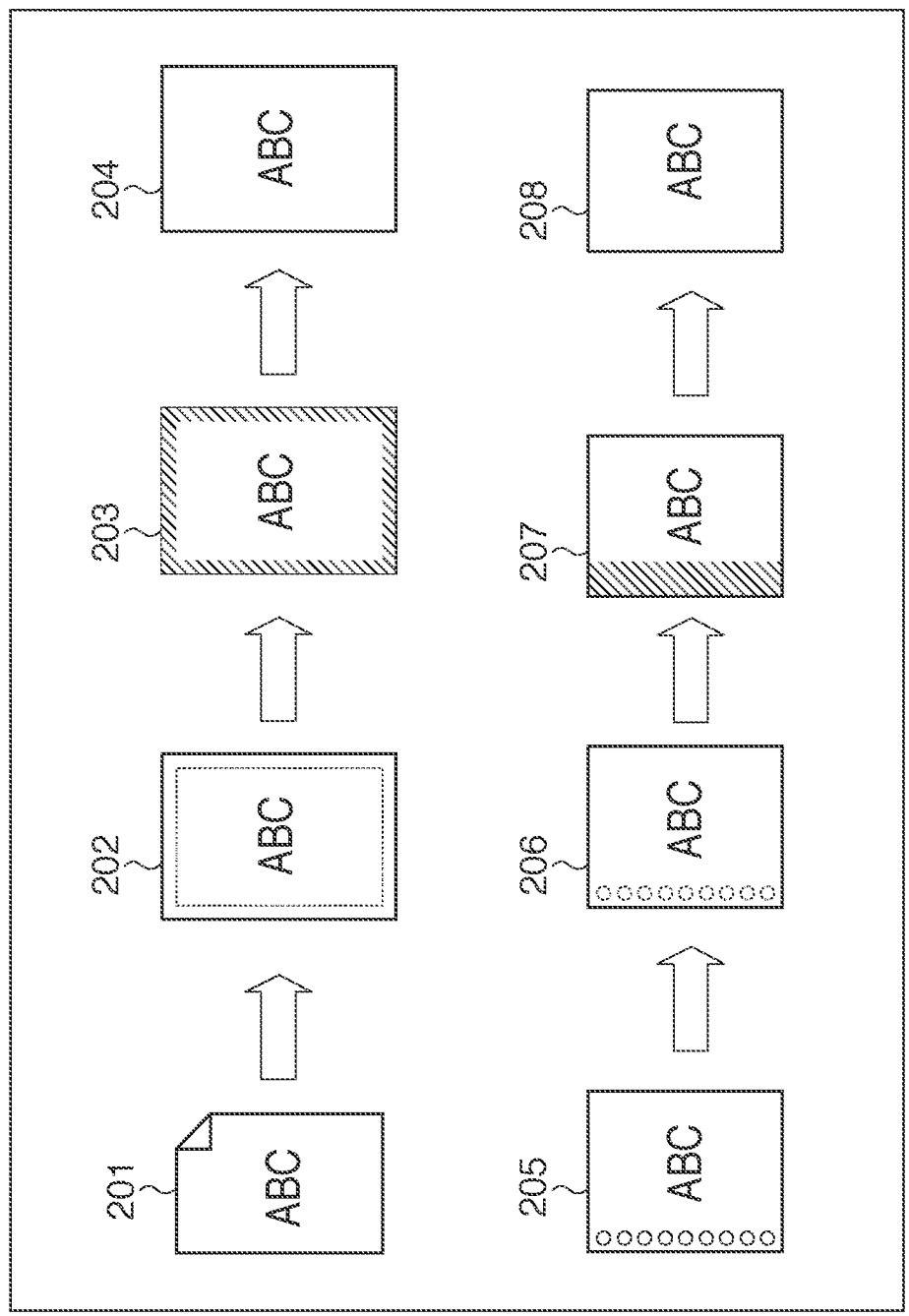
FIG. 2 is a view for explaining image mask processing in the copy function.

FIG. 2 is a view for explaining the image mask function. When an original 201 is placed on the original platen glass of the reading unit and copied, the shadows between the original and the original platen glass are captured, and faint shadows are output to the edges of the output image, as indicated by 202. The original frame erase function performs mask processing of filling the periphery of the read image data several mm with white before image output, thereby suppressing the phenomenon, as indicated by 203. This prevents the phenomenon that the shadows are printed in the output image, as indicated by 204.

When an original 205 with holes for filing is copied, the punch holes are captured as shadows upon reading and faintly output to the output paper sheet, as indicated by 206. The punch hole erase function performs mask processing of filling one side of the image with white, thereby suppressing the phenomenon, as indicated by 207. This prevents the phenomenon that the shadow is printed in the output image, as indicated by 208.

Such image mask processing is a function of filling part of a digital image with a specific color. That is, this processing fills part of a data area storing a digital image with specific data.

[Image Compression Method]

An image compression method will be described first. FIG. 3 is a view for explaining the image compression method. An example will be described here in which an image of color image data (RGB color system with 8 bits per color) expressed by 24 bits per pixel is compressed.

First, place focus on a local image formed from 2×2=4 pixels of the image data, as indicated by 301. To apply the processing of this embodiment to input image data, the image data is divided into blocks each formed from 2×2=4 pixels. Out of the four pixels, the upper left pixel value is defined as the representative color data of the 2×2 area, as indicated by 302. The representative is thus determined. Next, the color distribution is checked, as indicated by 303. It is checked whether the 2×2 area has pixels of the same color. The distribution pattern of the color is also checked. "Pixels of the same color" may be defined as pixels whose values are completely identical. Alternatively, pixels whose colors are similar to some extent may be determined as pixels of the same color. One to four colors are determined based on the number of colors of the 2×2 area. Color layout data is defined as well as the distribution pattern of the colors. The color layout is thus determined.

Figure 4:
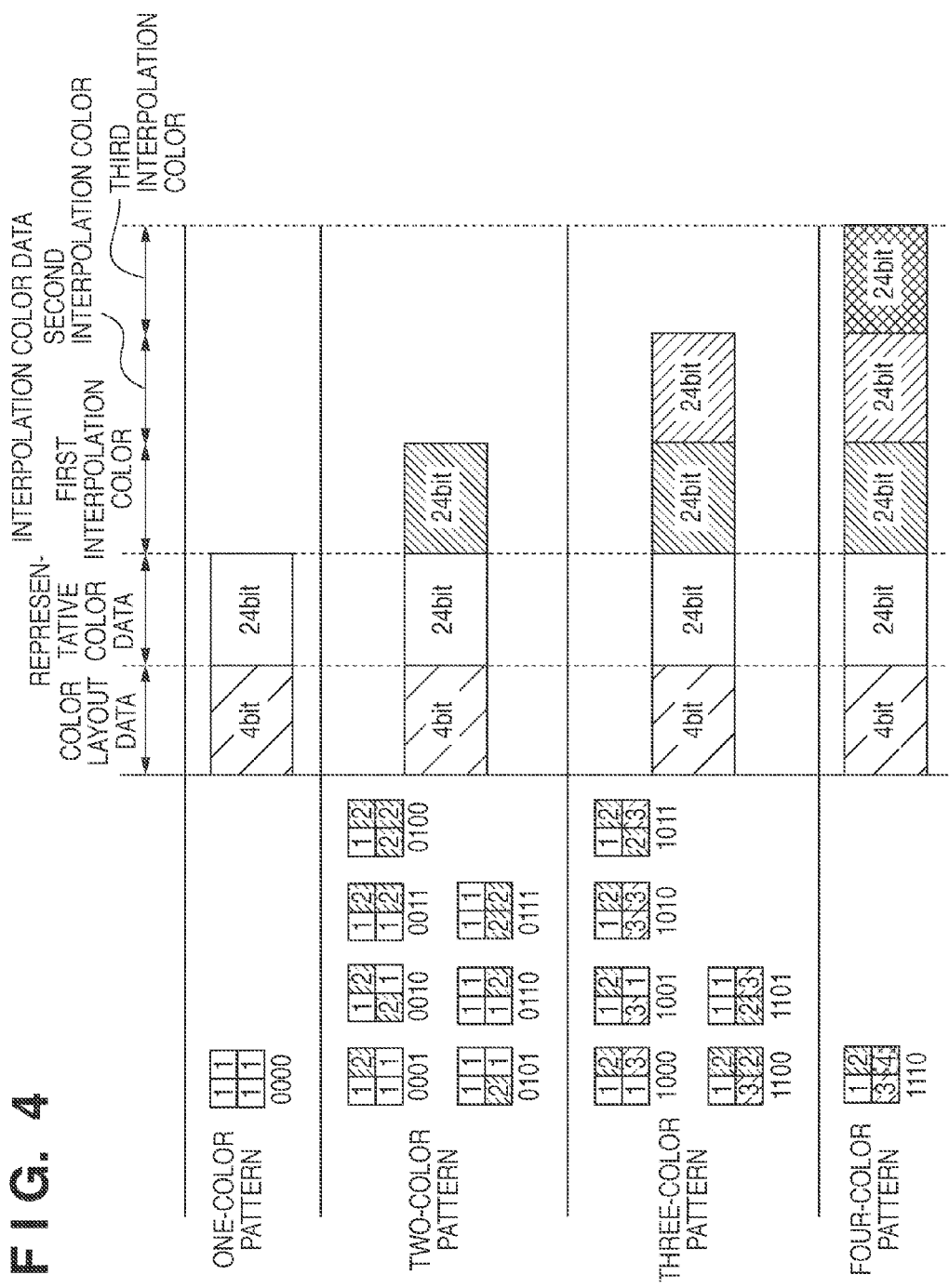
FIG. 4 is a view for explaining a color layout data conversion table of the compression method.

FIG. 4 shows a color layout data conversion table to be used to determine color layout data based on the number of colors and the distribution pattern. When performing processing using a 2×2 area, there are 15 different combinations of the number of colors and the distribution pattern, as shown in FIG. 4. Hence, 4-bit data is determined as color layout data. Finally, interpolation image data is determined. This data corresponds to interpolation pixel values representing colors other than the representative color, as indicated by 304, when the 2×2 area includes two or more colors. The interpolation colors are thus determined.

For example, the 2×2 area of the example shown in FIG. 3 originally includes 32×4 bits=128-bit data. However, the data is three-color data and can therefore be compressed to 32 bits (representative color data)+32×2 bits (interpolation image data)+4 bits (color layout data)=100 bits. That is, compressing the input image data produces representative color data, interpolation image data, and color layout data.

Figure 5:
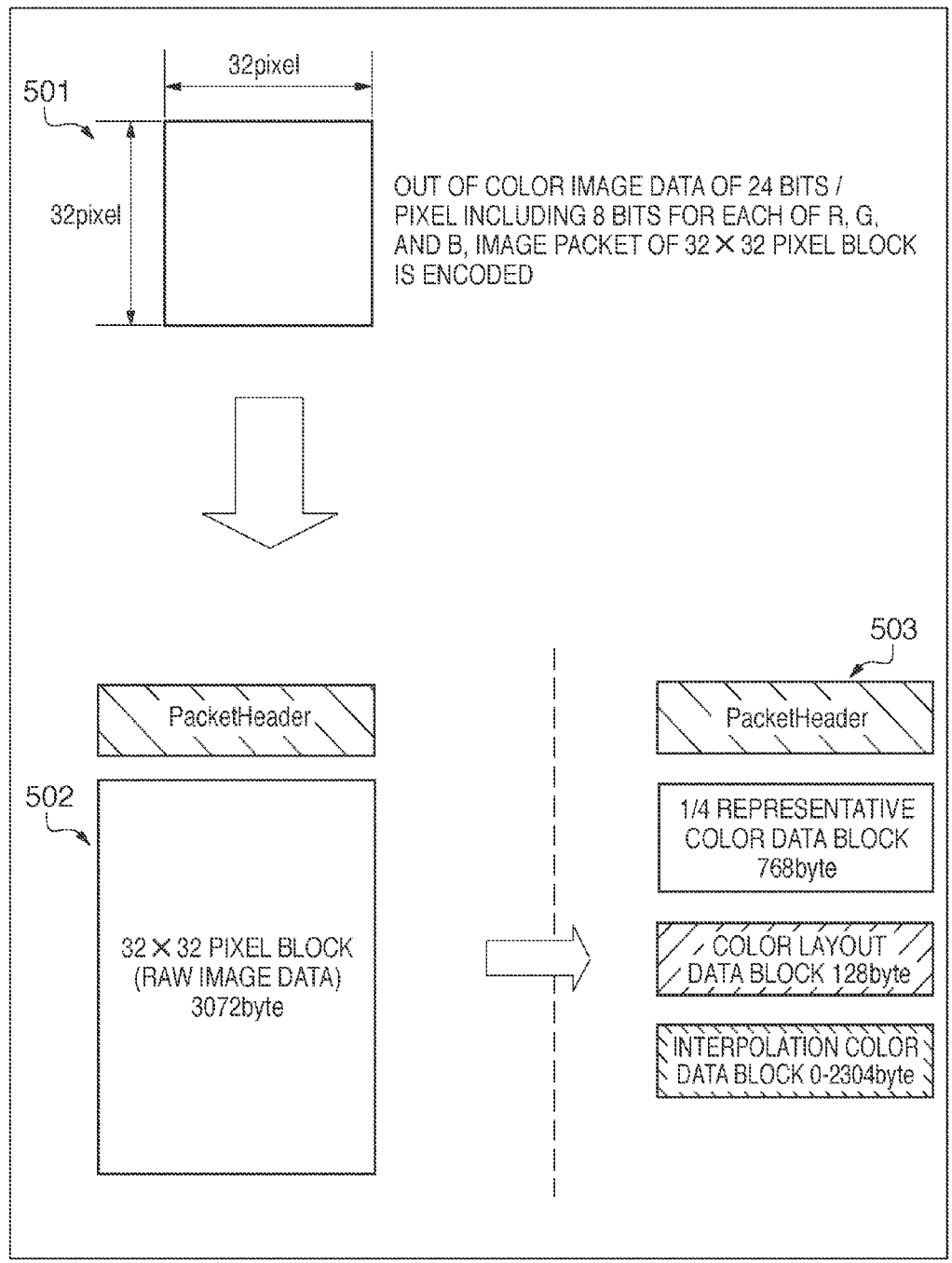
FIG. 5 is a view showing a data structure obtained by compression based on the compression method.

FIG. 5 illustrates an example when the above-described compression method is performed for a 32×32 pixel packet image. Consider a 32×32 pixel packet image whose image block is expressed by the RGB color system with 24 bits per pixel, as indicated by 501. When holding the raw image without any processing, the raw image data is directly held in addition to packet header data, as indicated by 502. In this case, the data size is 3,072 bytes because the image remains raw. Note that the packet header data includes information of, for example, the position of the 32×32 pixel block in the image data. The included information enables to designate the target position of image mask processing to be described later.

The structure of compressed data generated by compressing the packet image by the above-described compression method is indicated by 503. Since a representative color block is generated for each 2×2 unit block, 768 bytes corresponding to ¼ the whole data are generated first. Then, since 4-bit color layout data is generated for each 2×2 unit block, a 128-byte color layout data block is generated. Furthermore, interpolation image data of zero to three pixels is generated for each 2×2 unit block. Hence, the length of the interpolation image data block is indeterminate, and 0- to 2304-byte data is generated. As the number of pixels determined to have the same color in each 2×2 unit block increases, the data length shortens, and the compression ratio rises. This compression method implements data compression by separately holding representative color data, color layout data, and interpolation image data.

Figure 6:
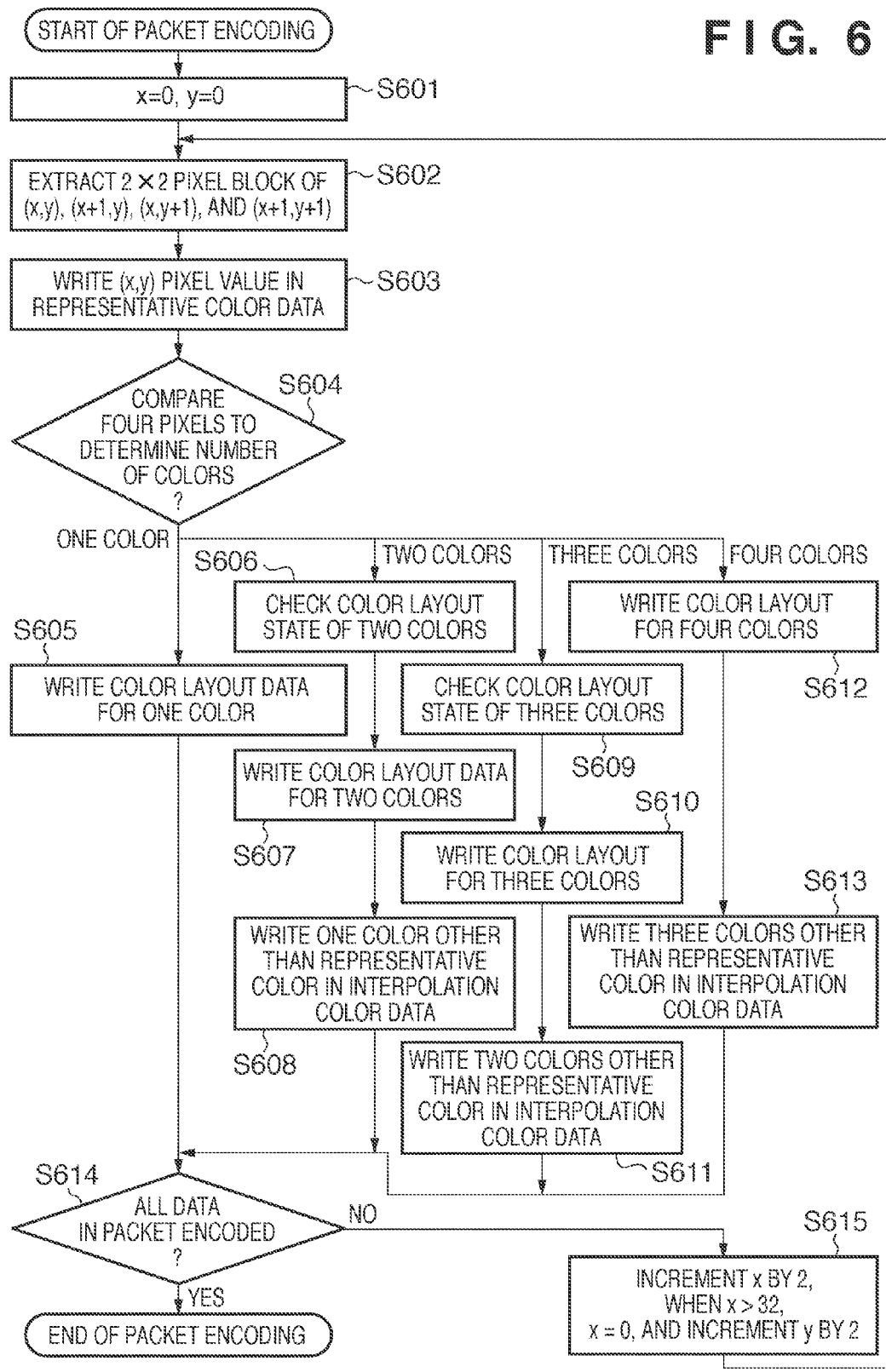
FIG. 6 is a flowchart illustrating the processing procedure of the compression method.

FIG. 6 is a flowchart illustrating the compression method according to this embodiment which is processed by the CPU 101. A case is assumed here in which the 32×32 pixel packet image shown in FIG. 5 is compressed. First, x and y coordinate values representing the position information of the packet image are cleared to 0 ($S_{601}$). To extract the image of a 2×2 unit block, the values of 2×2 neighboring pixels including the x and y coordinates are extracted (S602). To determine representative color data in the unit block, the (x,y) pixel value is defined as the representative color and written in the representative color data area (S603).

The extracted four pixel values are checked to determine the number of colors of the block (S604). Note that when determining pixels of the same color, pixels whose values are not completely identical may be determined as pixels of different colors, or a threshold may be prepared to perform rounding processing of regarding approximate pixel values based on the threshold as the same color. Same color determination is executed here to obtain the number of colors. If the 2×2 pixel block is determined to include one color, color layout data representing one color is acquired from the color layout data conversion table shown in FIG. 4 and written in the color layout data area (S605). If the 2×2 pixel block is determined to include two colors, the image shape of the two colors is checked (S606). Based on the image shape and the information representing that the pixel block includes two colors, color layout data is acquired from the color layout data conversion table shown in FIG. 4 and written in the color layout data area (S607). In addition, the one color other than the representative color is written in the interpolation image data area as interpolation image data (S608).

If the 2×2 pixel block is determined to include three colors, the image shape of the three colors is checked in a similar manner (S609). Based on the image shape and the information representing that the pixel block includes three colors, color layout data is acquired from the color layout data conversion table shown in FIG. 4 and written in the color layout data area (S610). In addition, the two colors other than the representative color are written in the interpolation image data area as interpolation image data (S611). If the 2×2 pixel block is determined to include four colors, color layout data representing four colors is acquired from the color layout data conversion table shown in FIG. 4 and written in the color layout data area (S612). In addition, the three colors other than the representative color are written in the interpolation image data area as interpolation image data (S613). With the above-described processing, compression of the 2×2 pixel block ends.

Next, it is determined whether all data in the packet have been encoded (S614). If an uncompressed 2×2 pixel block still exists, the coordinate values are moved (S615). The x coordinate is moved by +2. If the x coordinate exceeds 32, that is, if the processing has ended for all blocks with the same y coordinate, the x coordinate is returned to 0, and the y coordinate is moved by +2. Then, the new 2×2 pixel block is compressed (S602). When all 2×2 pixel blocks of the packet image have been compressed, encoding ends. Compression by such a compression method allows to suppress the amount of image data to be handled in the apparatus.

Note that in this embodiment, processing is performed by dividing image data into 2×2 pixel blocks. However, the present invention is not limited to this. A larger size corresponding to a predetermined number of pixels may be employed as the block unit in accordance with, for example, the attribute of the image to be processed. Alternatively, a plurality of blocks may be handled as a group. In this case, the number of color distribution patterns (color layout information) and the number of colors to be held (interpolation image data) also increase, as a matter of course.

Compressed image data can also be decoded using representative color data, color layout data, and interpolation image data obtained by compression. In the decoding procedure, representative color data and interpolation image data are assigned based on color layout data. The reconstructed image data can be output from the display unit 107 or an image forming apparatus (not shown).

[Image Mask Processing]

Figure 7:
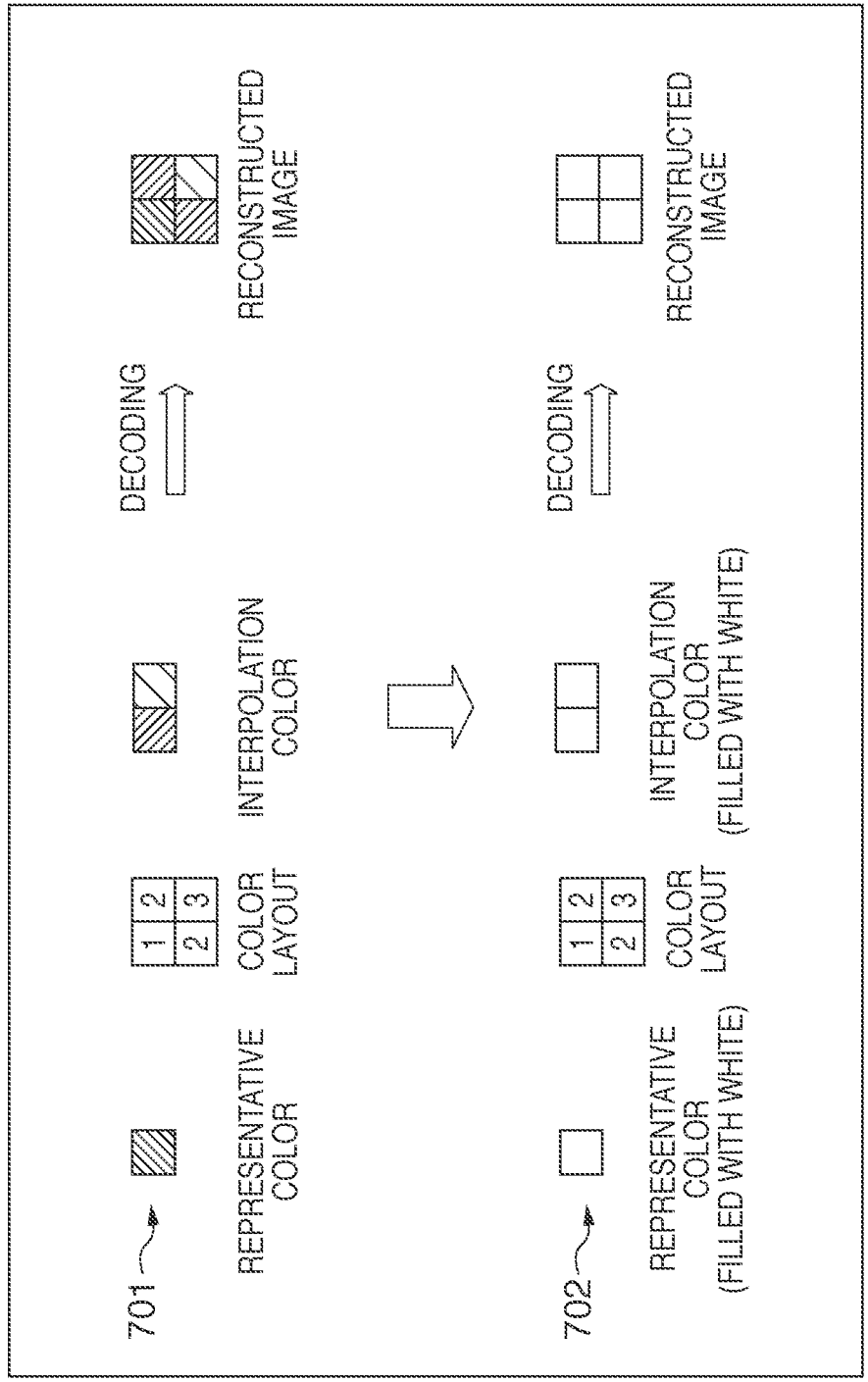
FIG. 7 is a view for explaining the contents of image mask processing according to the first embodiment.

Processing (image mask processing) of filling thus compressed image data with a specific color will be explained next. FIG. 7 is a view for explaining specific color filling processing. A normal decoding procedure indicated by 701 will be described first. At the time of decoding, representative color data, color layout data, and interpolation image data are used. An example of decoding of three-color data is illustrated. Out of the color layout data, a portion corresponding to the color of pixel 1 is replaced with the representative color data. Next, a portion corresponding to pixel 2 is replaced with the first data of the interpolation colors. Finally, a portion corresponding to pixel 3 is replaced with the second data of the interpolation colors. The pixel values are replaced in this way, thereby reconstructing the original image.

As is apparent from the above-described decoding method, when filling the 2×2 image block with, for example, white, the image is converted into a white image by replacing the representative color and the interpolation colors with a pixel value representing white, as indicated by 702. The method of this embodiment makes it possible to fill an image with a specific color in a smaller number of processes by filling part of compressed data in this way.

Figure 8:
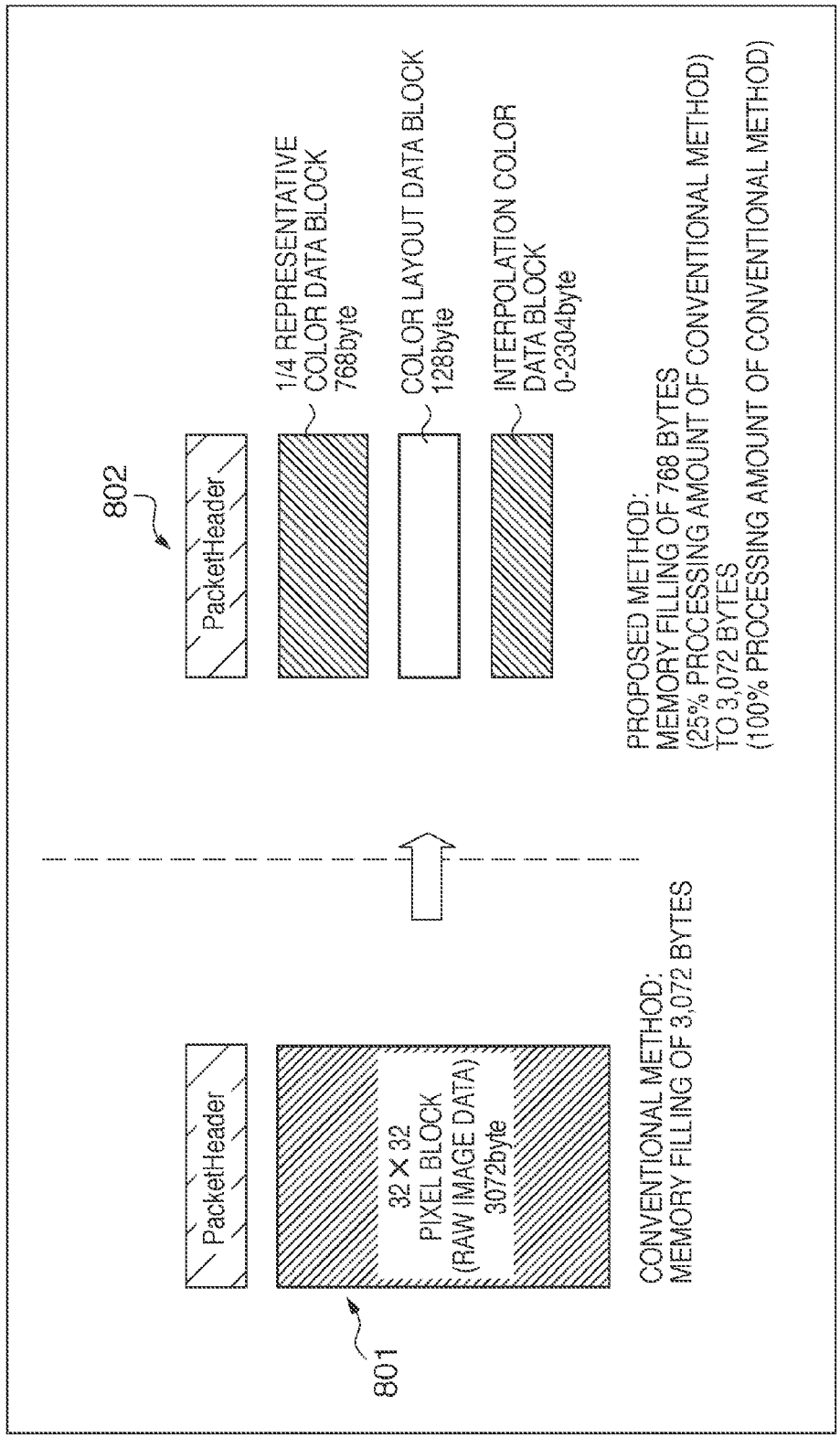
FIG. 8 is a view showing the effects of the method according to the first embodiment and image mask processing of the conventional method.

FIG. 8 illustrates a state in which the data filling amount is made smaller by the method of this embodiment than by the normal filling processing. In the conventional method, filling processing is performed for a raw image, as indicated by 801. Hence, simple processing of memory filling of 3,072 bytes occurs. In the method of this embodiment, memory filling processing occurs for the representative color block and the interpolation image block, as indicated by 802. As the number of data determined as the same color in the packet image increases, the data amount of the interpolation image block decreases. For this reason, the memory filling amount cannot be represented by a constant value. The memory filling amount is minimum when all 2×2 image blocks are determined to have the same color. In this case, the interpolation image block contains no data. At this time, processing of memory filling of only 768 bytes occurs, and the processing amount can be as small as 25% that of the conventional method.

The memory to be filled is maximum when all 2×2 image blocks are determined to include four colors. In this case, 2304-byte data exists in the interpolation image data block. At this time, processing of memory filling of 3,072 bytes occurs in total. That is, the same memory filling processing as in the conventional method occurs. However, the image data often locally includes the same color or similar pixel values. Since a 2×2 image block is often determined to have a single color, the probability that all pixel values indicate different colors is very low. It is therefore possible to implement packet image filling by a memory filling amount smaller than in the conventional method.

Figure 9:
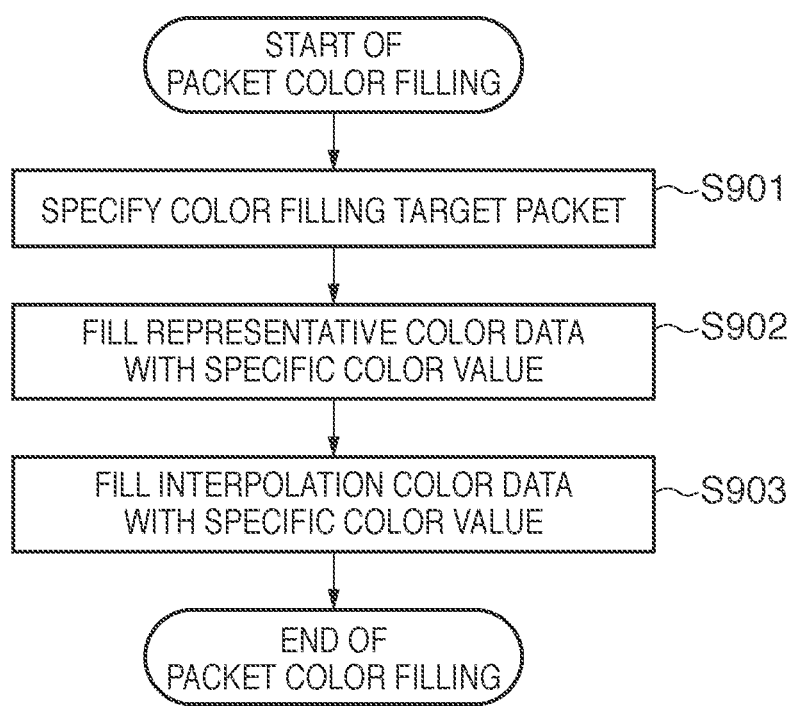
FIG. 9 is a flowchart illustrating a processing procedure according to the first embodiment.

FIG. 9 illustrates a processing procedure of the method according to this embodiment which is processed by the CPU 101. When packet color filling processing starts, the user designates original frame erase or punch hole erase in accordance with the display on the display unit 107. A packet corresponding to the color filling target position in the image data determined by the designation is specified (S901). If the filling processing is original frame erase as in FIG. 2, the peripheral portion of the entire image is the color filling target. If the processing is punch hole erase, a position on the image designated by the user via a keyboard displayed on the display unit 107 is the color filling target region. Note that if no designation is input, the left edge of the image is determined as the color filling target region. The position on the process target image data can be specified using, for example, information included in the packet header of each packet. The color filling target position may be specified by the user in advance. More specifically, when reading an original having punch holes, color filling is performed for packets corresponding to the left-edge image data. Representative color data is filled with a pixel value representing a specific color (S902). Next, interpolation color data is similarly filled with the pixel value representing the specific color (S903). With this processing, filling a packet image with a specific color can be implemented.

Note that the color filling target packet is assumed to be, for example, the portion of the original frame or the portion with the punch holes as shown in FIG. 2. The position of the portion can be specified using, for example, information included in the packet header shown in FIG. 5.

Second Embodiment

Figure 10:
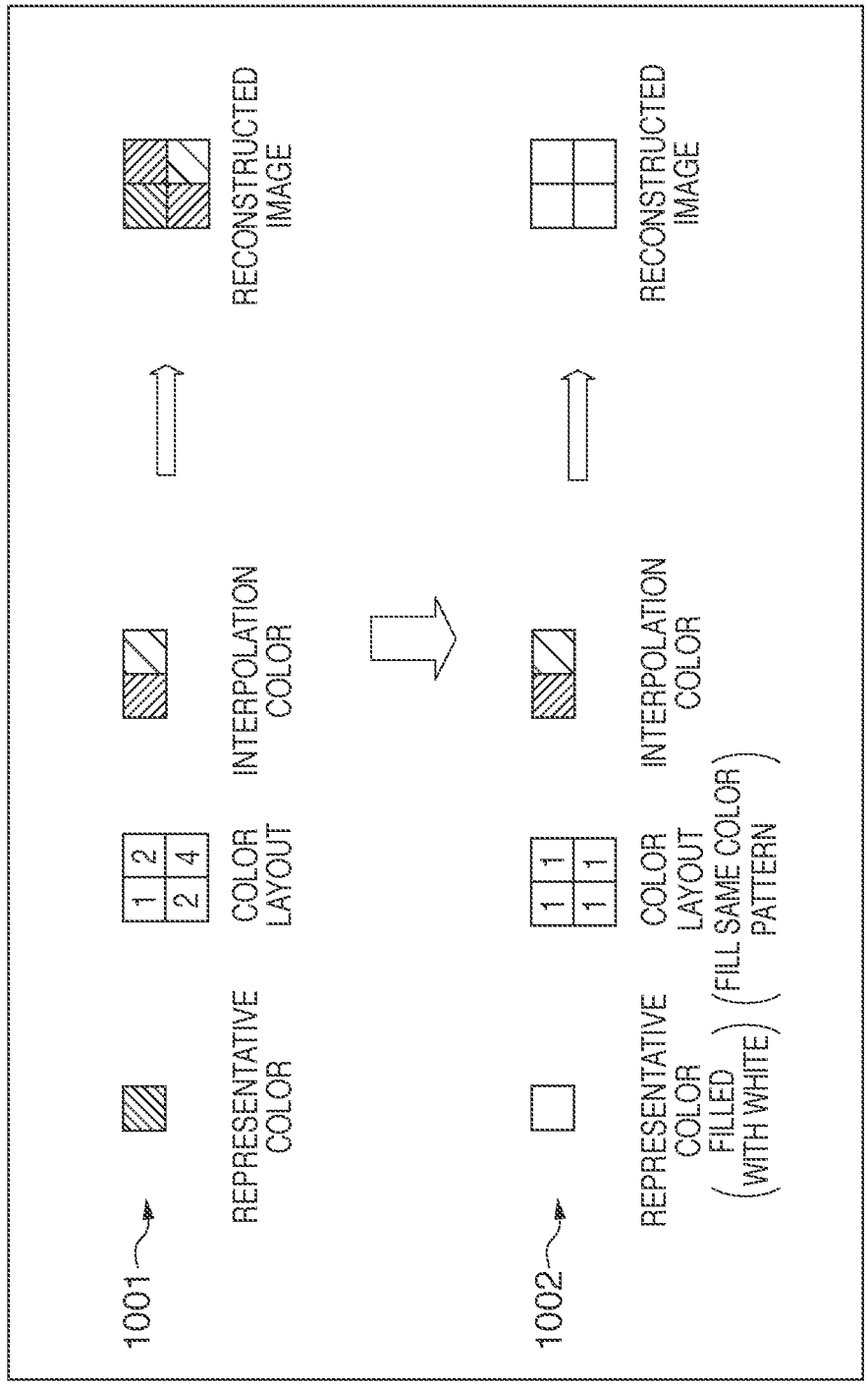
FIG. 10 is a view for explaining the contents of image mask processing according to the second embodiment.

In the second embodiment of the present invention, image mask processing by a specific color is implemented by a method different from that of the first embodiment. A description of the same portions as in the first embodiment will not be repeated. FIG. 10 is a view for explaining specific color filling processing according to the second embodiment. The normal decoding procedure indicated by 1001 is the same as in FIG. 7 of the first embodiment, and a description thereof will not be repeated. As is apparent from this decoding method, when filling the 2×2 image block with, for example, white, the representative color is filled with a pixel value representing white. Then, the color layout data is filled with data representing that the image block includes one color. As is apparent, the image is converted into a white image at the time of decoding, as indicated by 1002. The second method of the present invention makes it possible to fill an image with a specific color in a smaller number of processes by filling part of compressed color data and color layout data.

Figure 11:
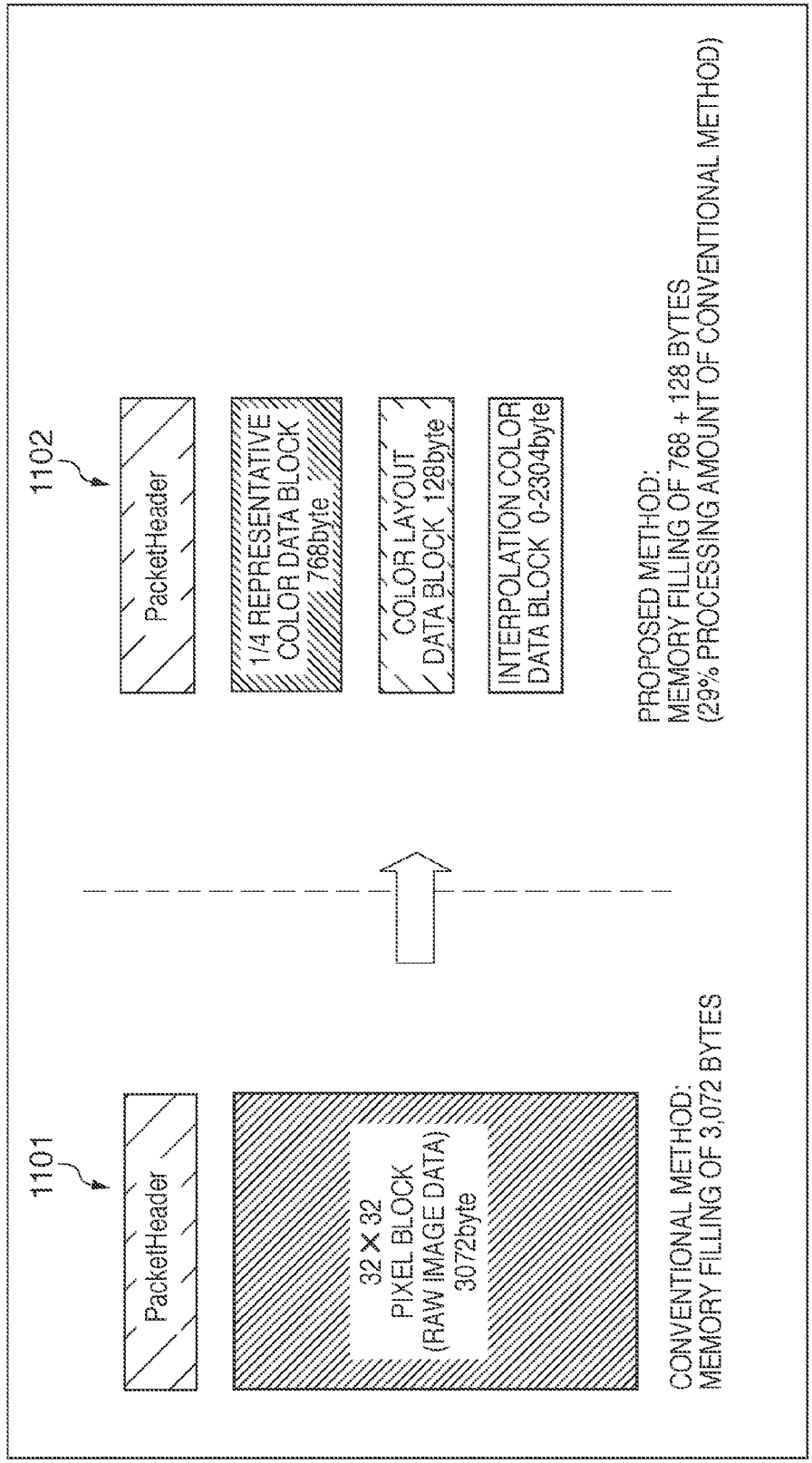
FIG. 11 is a view showing the effects of the method according to the second embodiment and image mask processing of the conventional method.

FIG. 11 illustrates a state in which the data filling amount is made smaller by the method of this embodiment than by the normal filling processing. In the conventional method, filling processing is performed for raw image data, as indicated by 1101. Hence, simple processing of memory filling of 3,072 bytes occurs. In the method of this embodiment, memory filling processing occurs for the representative color data block and the color layout data block, as indicated by 1102. These data areas have predetermined data amounts independently of the contents of the image. Hence, in the second method, processing of filling the representative color data block and the color layout data block with specific data, and processing of filling data of 896 bytes occurs in total. The processing amount is approximately 29% that of the conventional method. It is therefore possible to reduce data filling processing with the specific value.

Figure 12:
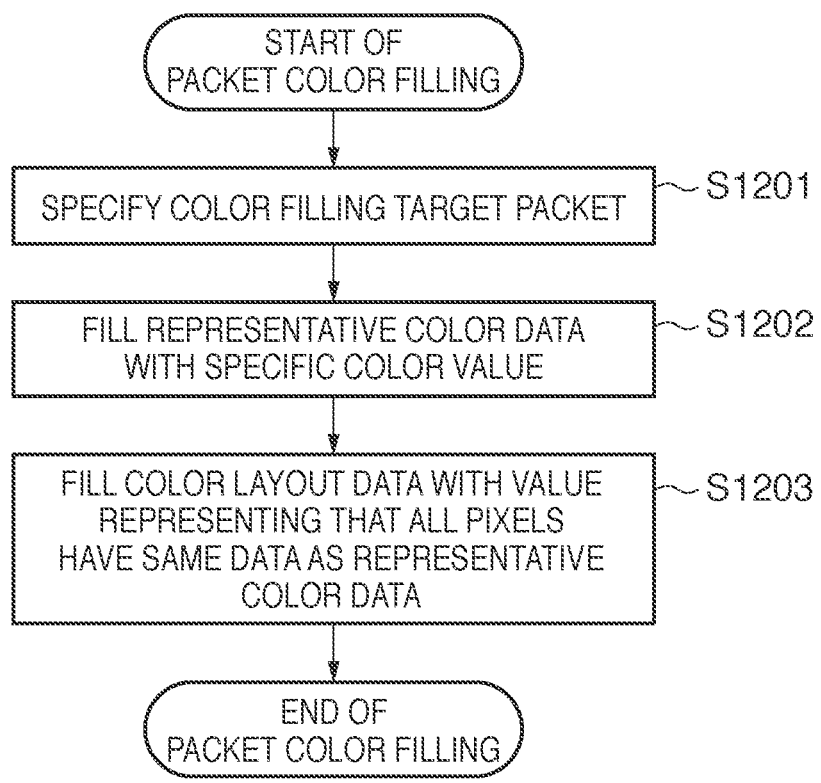
FIG. 12 is a flowchart illustrating a processing procedure according to the second embodiment.

FIG. 12 illustrates a processing procedure of the method according to this embodiment which is processed by a CPU 101. When packet color filling processing starts, a packet corresponding to the color filling target position is specified first (S1201). The position on the process target image data can be specified using, for example, information included in the packet header of each packet. The color filling target position may be specified by the user in advance. More specifically, when reading an original having punch holes, color filling is performed for packets corresponding to the left-edge image data. Representative color data is filled with a pixel value representing a specific color (S1202). Next, color layout data is filled with a data value representing that the image block includes one color, and all pixels have the same data as the representative color data (S1203). With this processing, filling a packet image with a specific color can be implemented.

Third Embodiment

Figure 13:
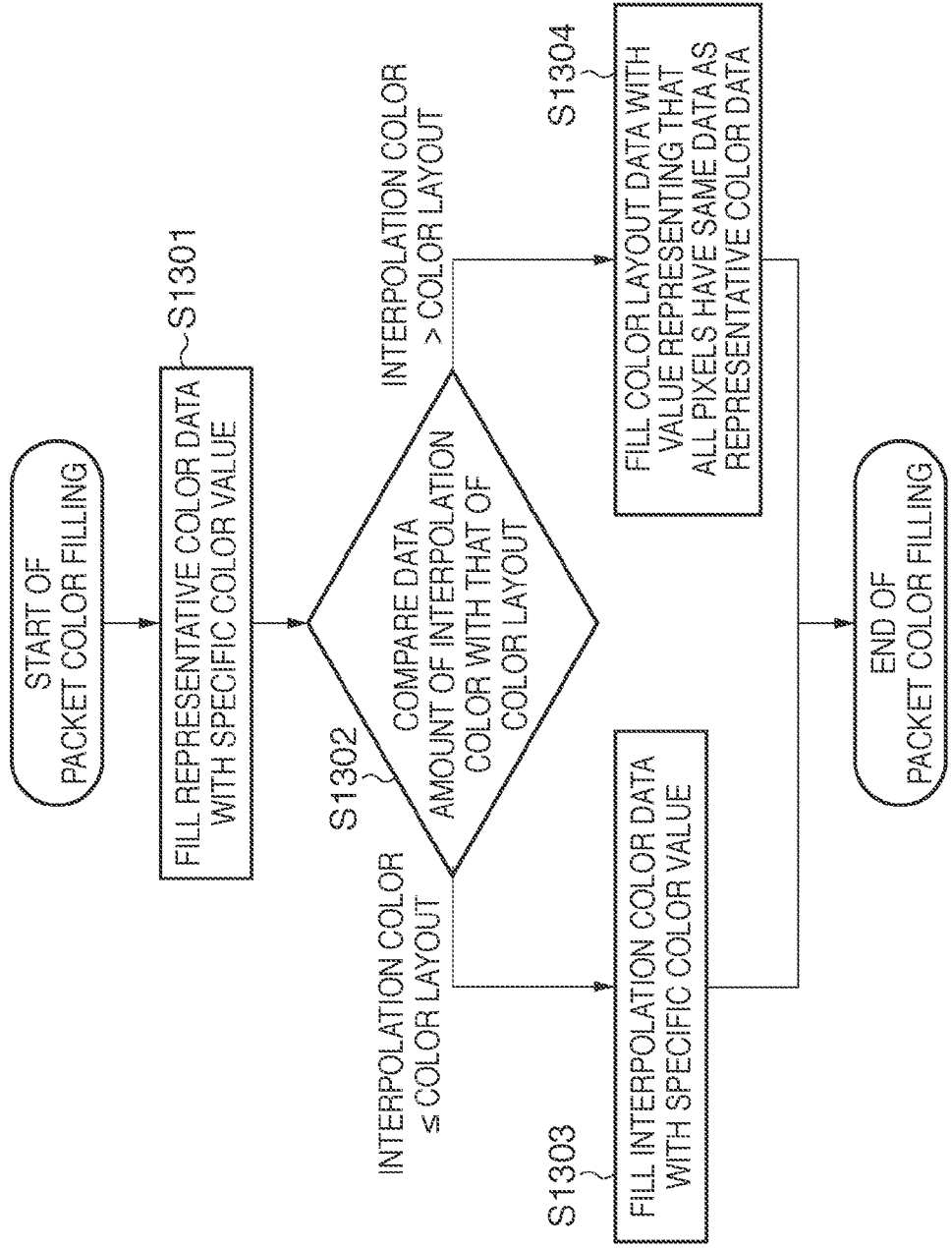
FIG. 13 is a flowchart illustrating a processing procedure according to the third embodiment.

As the third embodiment of the present invention, a more efficient method that combines the methods of the first and second embodiments will be proposed. In this method, a method with a smaller data filling processing amount is selected by selectively executing the method of the first embodiment and that of the second embodiment. FIG. 13 illustrates a processing procedure according to this embodiment which is executed by a CPU 101.

When processing of filling a packet image with a specific color starts, representative color data is first filled with a pixel value representing the specific color (S1301). Next, the interpolation pixel data amount is compared with the color layout data amount (S1302). If the interpolation pixel data amount is smaller than the color layout data amount, the method of the first embodiment is used to fill the interpolation pixel data with the pixel value representing the specific color (S1303). Conversely, if the color layout data amount is smaller than the interpolation pixel data amount, the method of the second embodiment is used to fill the color layout data with a data value representing that the image block includes one color, and all pixels have the same data as the representative color data (S1304).

According to this embodiment, it is possible to more efficiently reduce the amount of data filling processing in the memory and thus reduce the memory filling processing.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-059926, filed Mar. 16, 2010, which is hereby incorporated by reference herein in its entirety.

What is claimed is:

1. An image processing apparatus for performing filling processing for filling a part of an image with a specific color, comprising:

a holding unit which holds compressed image data that is generated by compressing input image data, wherein the compressed image data have, for each block formed from a predetermined number of pixels included in the input image data, a representative color of the block, a color layout of pixels included in the block, and an interpolation color which is a color other than the representative color included in the block; and a fill unit which performs, without decompressing the compressed image data, filling processing for filling the part of the compressed image data with the specific color, wherein, when filling the block corresponding to the part of the compressed image data with the specific color, said fill unit replaces the representative color and the interpolation color of the block corresponding to the part of the compressed image data with the specific color.

2. The apparatus according to claim 1, further comprising a compression unit which compresses the input image data into the compressed image data, wherein the compression unit comprises:

a representative color determination unit which determines the representative color for each block formed from the predetermined number of pixels included in the input image data;

a color layout determination unit which determines the color layout of the pixels for each block formed from the predetermined number of pixels included in the input image data; and an interpolation color determination unit which determines the interpolation color for each block formed from the predetermined number of pixels included in the input image data.

3. The apparatus according to claim 1, further comprising a division unit which divides the input image data into the blocks each formed from the predetermined number of pixels.

4. The apparatus according to claim 1, wherein the block formed from the predetermined number of pixels includes 2×2 pixels.

5. An image processing apparatus for performing filling processing for filling a part of an image with a specific color, comprising:

a holding unit which holds compressed image data that is generated by compressing input image data, wherein the compressed image data have, for each block formed from a predetermined number of pixels included in the input image data, a representative color of the block, a color layout of pixels included in the block, and an interpolation color which is a color other than the representative color included in the block; and a fill unit which performs, without decompressing the compressed image data, filling processing for filling the part of the compressed image data with the specific color, wherein, when filling the block corresponding to the part of the compressed image data with the specific color, said fill unit replaces the representative color and the interpolation color of the block corresponding to the part of the compressed image data with the specific color and replaces the color layout of the block corresponding to the part of the compressed image data with data representing that all pixels have the same color as the representative color.

6. An image processing apparatus for performing filling processing for filling a part of an image with a specific color, comprising:

a holding unit which holds compressed image data that is generated by compressing input image data, wherein the compressed image data have, for each block formed from a predetermined number of pixels included in the input image data, a representative color of the block a color layout of pixels included in the block, and an interpolation color which is a color other than the representative color included in the block; and a fill unit which performs, without decompressing the compressed image data filling processing for filling the part of the compressed image data with the specific color wherein, when the filling the block corresponding to the part of the compressed image data with the specific color, said fill unit filling replaces the representative color of the block corresponding to the part of the compressed image data with the specific color, and compares a size of data of the interpolation color with a size of data of the color layout, which are held by said holding unit, and wherein, if the data of the interpolation color is smaller, the fill unit further replaces the interpolation color of the block corresponding to the part of the compressed image data with and wherein, if the data of the color layout is smaller, the fill unit further replaces the color layout of the block corresponding to the part of the compressed image data with data representing that all pixels have the same color as the representative color.

7. A method of controlling an image processing apparatus for performing filling processing for filling a part of an image with a specific color comprising the steps of:

causing a holding unit of the image processing apparatus to hold compressed image data that is generated by compressing input image data, wherein the compressed image data have, for each block formed from a predetermined number of pixels included in the input image data, a representative color of the block, a color layout of pixels included in the block, and an interpolation color which is a color other than the representative color included in the block; and causing a fill unit of the image processing apparatus to perform, without decompressing the compressed image data, filling processing for filling the part of the compressed image data with the specific color, wherein, in the filling step, when filling the block corresponding to the part of the compressed image data with the specific color, the representative color and the interpolation color of the block corresponding to the part of the compressed image data are replaced with the specific color.

8. A non-transitory computer-readable storage medium storing a program which causes a computer to execute as:

a holding unit which holds compressed image data that is generated by compressing input image data, wherein the compressed image data have, each block formed from a predetermined number of pixels included in the input image data, a representative color of the block generated by a color layout of pixels included in the block, and an interpolation color which is a color other than the representative color included in the block; and a fill unit which performs, without decompressing the compressed image data, filling processing for filling a part of the compressed image data with the specific color, wherein, when filling the block corresponding to the part of the compressed image data with the specific color, the fill unit replaces the representative color and the interpolation color of the block corresponding to the part of the compressed image data with the specific color.

* * * * *